Nov. 25, 1958  C. VAN DER LELY ET AL  2,861,413
SIDE DELIVERY RAKING DEVICE

Filed Dec. 3, 1953  8 Sheets—Sheet 1

FIG:1

Nov. 25, 1958    C. VAN DER LELY ET AL    2,861,413
SIDE DELIVERY RAKING DEVICE

Filed Dec. 3, 1953            8 Sheets-Sheet 2

FIG: 2

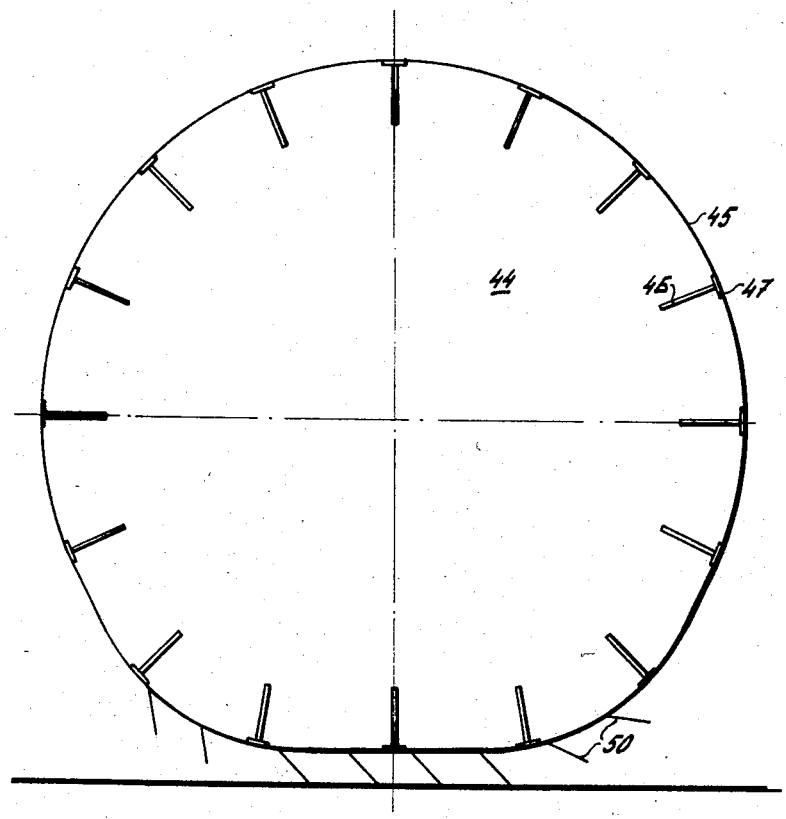

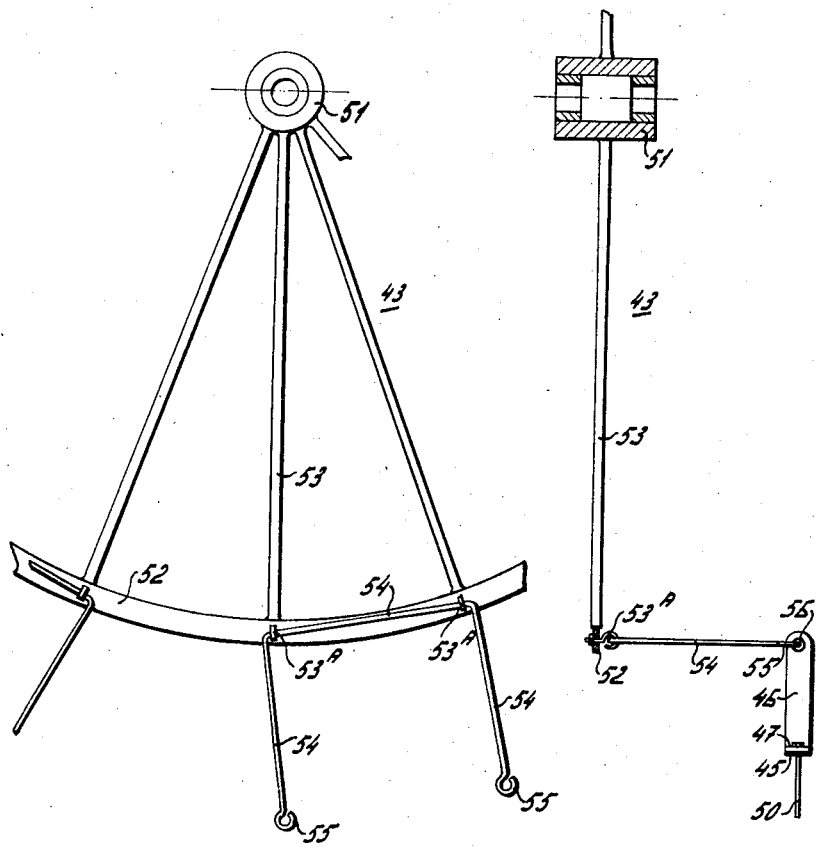

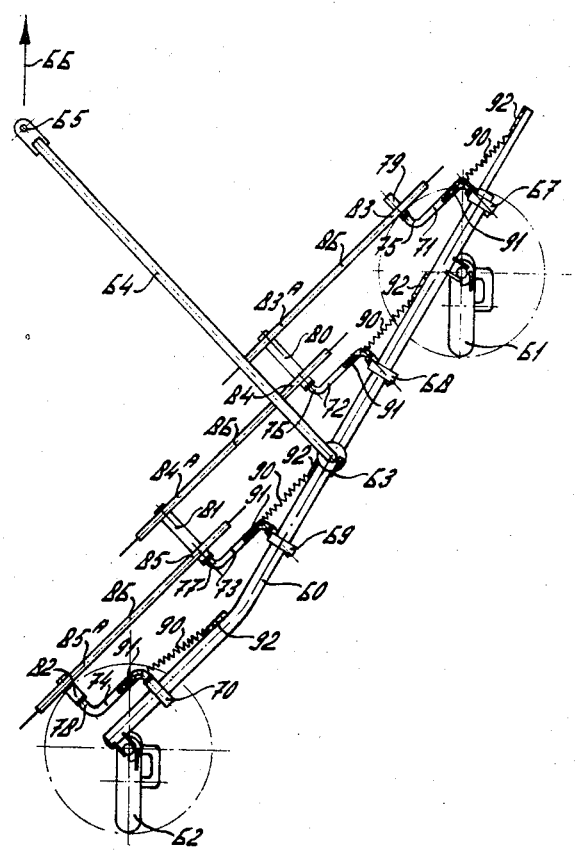
FIG:8

FIG:9
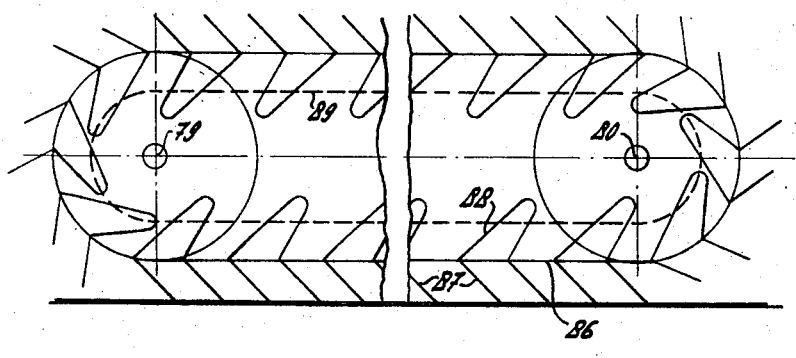

FIG: 10
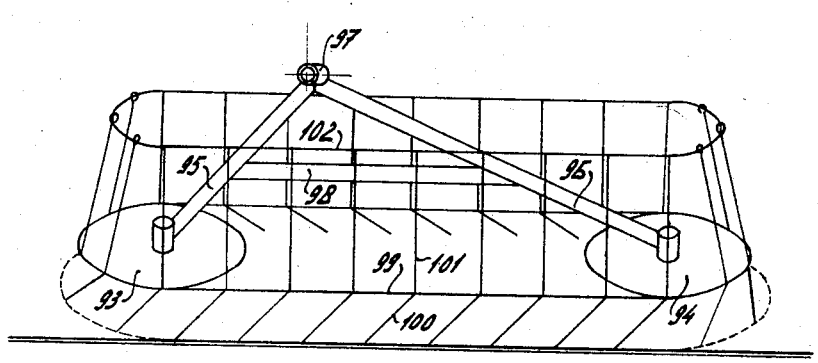
FIG: 11
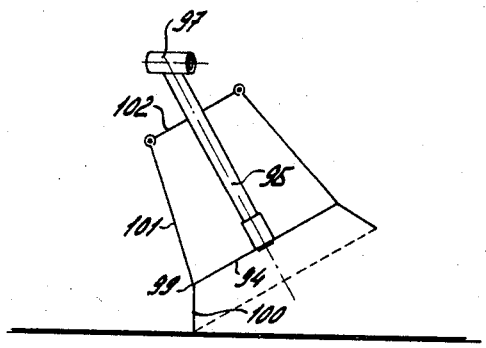

United States Patent Office 2,861,413
Patented Nov. 25, 1958

2,861,413

SIDE DELIVERY RAKING DEVICE

Cornelis van der Lely and Ary van der Lely, Maasland, Netherlands, assignors to C. van der Lely N. V., Maasland, Netherlands, a Dutch limited company Application December 3, 1953, Serial No. 395,958

Claims priority, application Netherlands December 15, 1952

22 Claims. (Cl. 56—377)

This invention relates to a device for laterally displacing grass, hay or other material lying on the ground, comprising a frame and a number of endless raking members arranged in overlapping relation and at an angle to the direction of travel of said frame, said raking members being provided with circumferential teeth or like catching means and being put into rotation by the contact of said catching means with the ground and/or the material lying thereon.

In known raking devices of the above mentioned kind the raking members are formed by rake wheels which are rotatably mounted in the frame. When the raking teeth are rigid and are fixedly secured to the wheels, at most two teeth of each rake wheel will be simultaneously in touch with the ground, so that the active working width of these rake wheels is very small. But also when the raking teeth are made to be resilient and permit more or less lateral deflection, the working width of the rake wheels remains very restricted, unless very large wheels are used. However, a rake wheel with a diameter which is twice the diameter of another rake wheel will have a working width that is considerably smaller than twice the working width of the latter, whereas the weight will be far more than twice the weight thereof, so that the possibility to increase the rake wheels is practically very limited.

It is an object of the present invention to provide a raking device having improved raking members with a considerably increased working width.

A further object of the invention is to carry out the raking members in the shape of wheels having a deformable circumference, in order that said wheels are turned towards the ground with a flattened part.

A still further object is to carry out said raking members as endless belts, chains or the like.

With these and other objects in view the invention resides in the fact that corresponding points of the supporting member for the teeth on the side which is turned towards the ground are situated on lines which are substantially parallel to the ground over an appreciable distance, so that a large number of teeth of said supporting member will be simultaneously in touch with the ground and/or the material lying thereupon.

The invention will be explained more in detail with reference to the accompanying drawings in which some practical embodiments of the raking device according to the invention have been illustrated by way of example and in which:

Figure 5 is a diagrammatic illustration, in side elevation, of the deformable rim, the supporting means therefor, and the raking teeth which are in proximity to the ground;

Figure 6 is a side elevational view of the hub and the rim parts, together with the supporting means for the deformable rim and teeth;

Figure 7 is a view at right angles to Figure 6, showing the hub in section and also showing the means for supporting the deformable or flexible rim;

Figure 8 is a top plan view of another embodiment of the invention;

Figure 9 is a diagrammatic view in side elevation of the structure shown in Figure 8;

Figure 10 is a perspective view showing the frame in full lines and other parts in diagram of a further embodiment; and Figure 11 is an end view of the structure illustrated in Figure 10.

Figure 1:
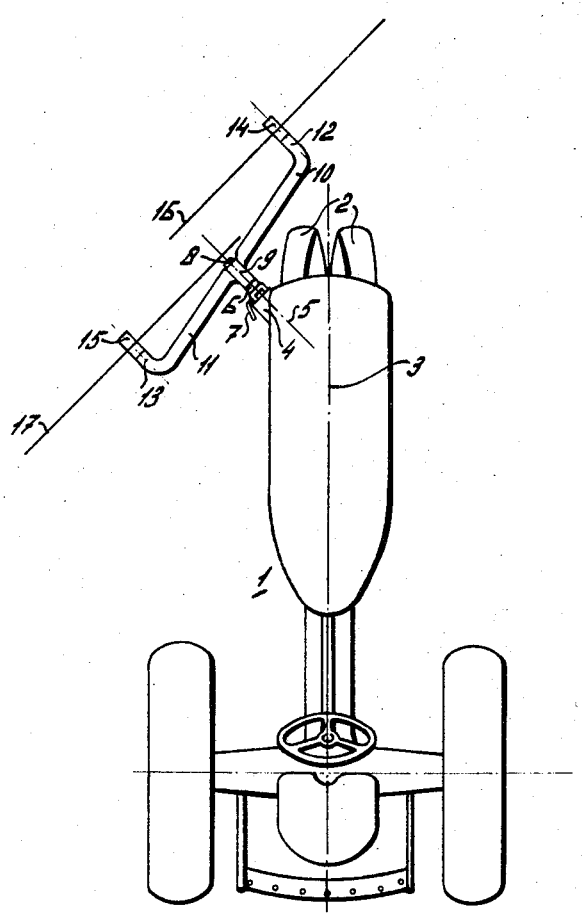
Fig. 1 shows a diagrammatic plan view of a raking device according to a first embodiment.

Referring to Fig. 1 of the drawings, a tractor 1 the steerable front wheels 2 of which are located very near to the longitudinal axis 3 is provided with a support 4 rigidly connected to the frame and carrying a supporting member 6 which is adjustable in height and may be locked by means of a locking member 7, it being understood that any suitable means for vertically adjusting the frame may be employed said supporting member 6 having its center line 5 directed forwards to the left and carrying an axle 8 in the same direction. Said axle 8 is surrounded by a bush 9 which is mounted to be rotatable but immovable in longitudinal direction upon the axle 8. The bush 9 is provided with two arms 10 and 11 extending in opposite directions and having extremities 12 and 13 bent in the direction of the center line 5. Upon the extremities 12 and 13 hubs 14 and 15 of diagrammatically shown rake wheels 16 and 17 are freely rotatable.

Figure 2:
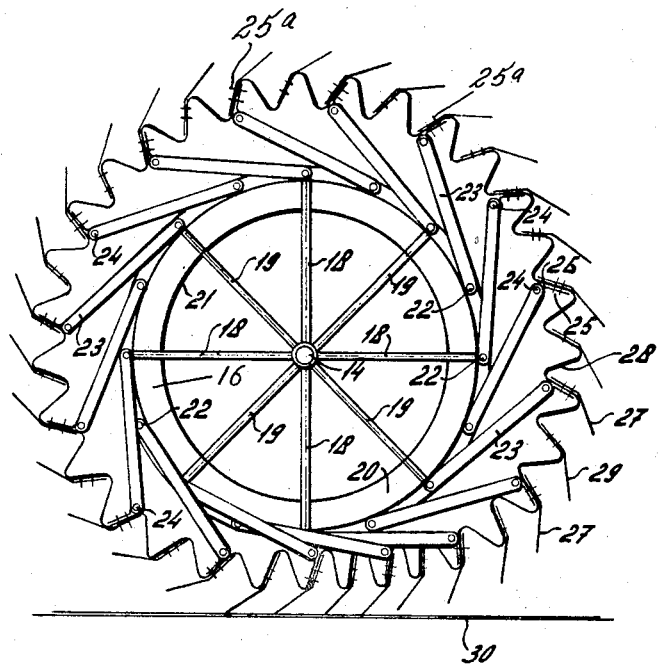
Figure 2 is a side elevational view of one form of a raking member.
Figure 3:
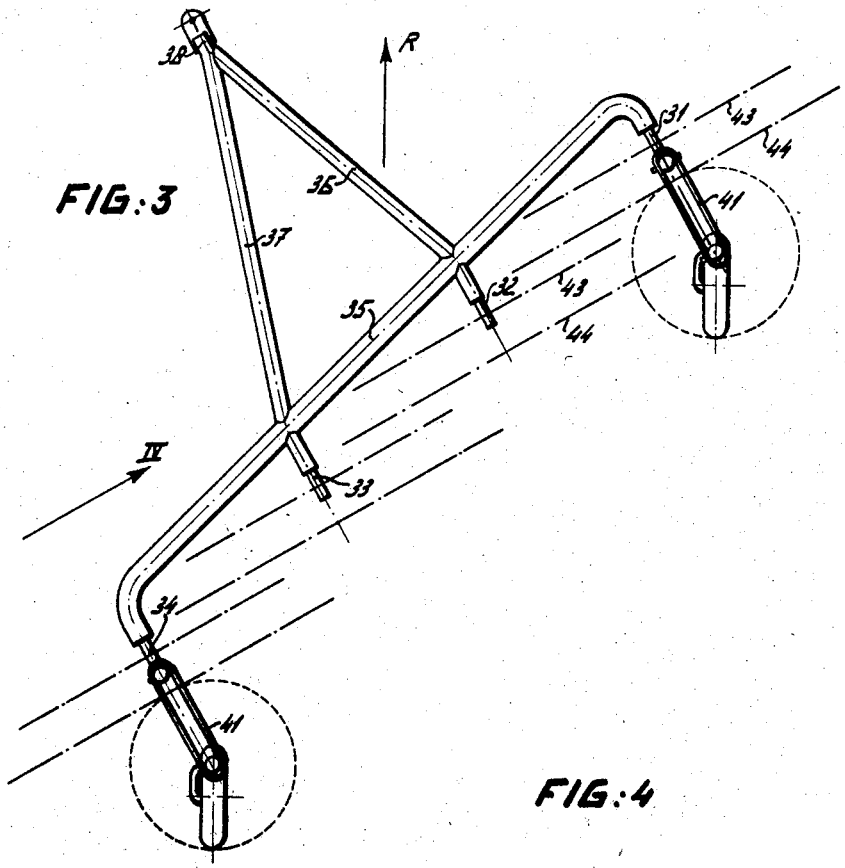
Figure 3 is a plan view showing a frame member of modified construction.
Figure 4:
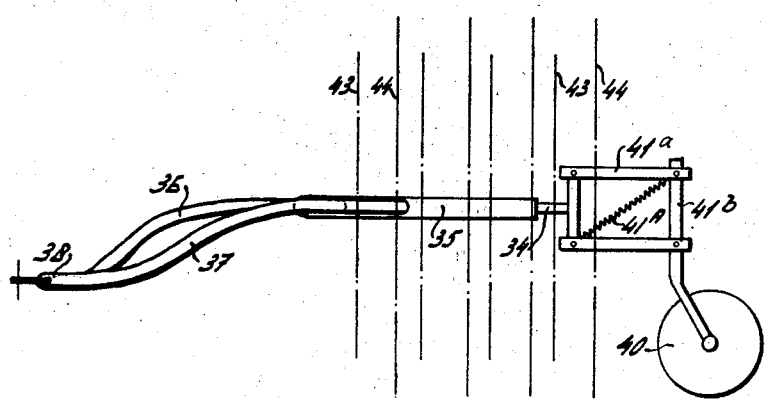
Figure 4 is a side elevational view of the device shown in Figure 3, as seen in the direction of the arrow IV.

The construction of the rake wheels 16 and 17 appears from Fig. 2 which illustrates the rake wheel 16. The hub 14 is connected by means of spokes 18 and 19 to a rim 20 in which a plurality of pins 22 is rotatably mounted. The pins are uniformly distributed along the circumference of the rim. Each pin 22 carries a connecting member in the shape of a flat arm 23 fixedly connected thereto and having its extremity again fixedly connected to a pin 24. The center lines of all pins 22 and 24 are always parallel to the center line of the hub 14.

Each arm 23 extends outwardly and substantially tangentially in one of its positions from pin 22 to pin 24 so that the arms 23 may partially turn over and along each other. Each pin 24 is hingedly mounted in a bushing 26 provided with a short strip 25. At the points 25a the strips 25 are riveted together with toothlike catching means 27 on a supporting member in the shape of an endless band 28 of flat spring steel which is undulated in its plane. Between every two catching means or teeth 27 two undulations of the band are located. Between every two teeth 27 still another catching means or tooth 29 has been riveted upon the ring 28. As appears from the lower part of Fig. 2, the elastic band 28 will deform itself upon bearing of the raking member upon the ground, in such a manner that corresponding points of the undulated band are located substantially at the same height above the ground over an appreciable distance. Consequently a large number of teeth, which are supposed to be rather stiff, will simultaneously come into contact with the ground and the raking member will thus present a large working width. The rakable material which is delivered to the left by the raking wheel 16 (Fig. 1) carried out in this manner and put into rotation by its contact with the ground and/or said rakable material, will be further displaced in lateral direction together with other material, if any, by the wheel 17 which is constructed in the same manner. The wheels 16 and 17 balance about the axle 8 and consequently rest with a relatively small pressure upon the ground, whereby the forces occurring in consequence of unevennesses of the terrain are distributed over both wheels and only half of said forces will act upon each wheel.

In the embodiment shown in Figs. 3–7 four wheels provided with catching means are rotatably mounted on short parallel and horizontal axles 31, 32, 33 and 34 fixedly connected to a beam 35 of the vehicular frame. The frame further comprises two rods 36 and 37 fixed to the beam 35 and intersecting each other in a point 38 located at a lower elevation than the beam and in which a fastening member permits the attachment of the frame to a tractor by means of a conventional pivot pin, not shown, but which is well understood in this art. Furthermore the frame is supported by two running wheels 39 and 40, of which only the latter has been indicated in Fig. 4, said running wheels being each connected to one of the axles 31 and 34 through a deformable parallelogram 41. This parallelogram consists of two horizontal rods 41a and 41b and two vertical rods 41c and 41d hingedly connected together. By means of springs 41A in the parallelograms 41 the greater part of the weight of the frame and that of the four rake wheels will be resiliently transmitted to the running wheels 39 and 40.

The construction of one of the four rake wheels is further shown in Figs. 5–7. Each wheel comprises a rigid wheel 43 and a supple ring 44. The ring 44 shown in Fig. 5 is composed of a flexible steel band 45 upon which inwardly extending supports in the shape of flat bars 46 are screwed or riveted with a base piece 47, said band 45 further carrying a plurality of resilient teeth 50 serving as catching means.

The flexible band 45 is kept in its plane by means of the rigid wheel 43 which according to Figs. 6 and 7 is composed of a hub 51 and a rim 52 interconnected by spokes 53, the rim 52 being provided with eyelets 53A. Every two eyelets 53A carry a rocking member in the shape of a bow 54; in Fig. 6 said bows have been shown for simplicity's sake in the plane of the wheel 43, but in the working position of the raking member they are at right angles to the plane of the wheel 43 (as has been clearly shown in Fig. 7) and are hooked with each of the hoked shaped bent extremities 55 into an aperture 56 provided in the free extremity of each flat bar 46.

The wheel 43 mounted upon one of the axles 31—34 moves a great part of the material to be delivered to the left aside, the remaining part of the material being displaced completely to the left by the band 45 provided with the teeth 50. The support of the band 45 by the wheel 43 is such that the band remains substantially circular and only obtains a flat portion on the lower side, by which a large working width is assured.

In the embodiment shown in Figs. 8 and 9 a frame beam 60 is provided which is supported near its ends by running wheels 61 and 62 and to the middle of which is connected a draw arm 64 which is rotatable about a vertical axis and may be locked with a locking member 63. This structure is conventional, that is, a means to lock a tool supported frame such as the frame 60 in fixed relationship with a drawbar such as the drawbar or arm 64. The draw arm 64 may be hingedly connected with its free extremity 65 to a tractor so as to be movable in all directions and may be pulled forward in the direction of the arrow 66. The beam 60 carries four bearings, 67, 68, 69 and 70 in which the parallel crank shafts of cranks 71, 72, 73 and 74 are mounted. The crank pins 75, 76, 77 and 78 of the cranks carry bushings 79, 80, 81 and 82 rotatable on axes which are parallel to each other and to the crank shafts. The bushing 79 serves as the hub of a sprocket wheel 83, whereas the bushing 80 forms the hubs of two sprocket wheels 83A and 84; the bushing 81 forms the hubs of two sprocket wheels 84A and 85, whereas the bushing 82 serves as the hub of a sprocket wheel 85A. The sprocket wheels are pairwise coplanar, as is e. g. the case for the wheels 83 and 83A, and over each pair of wheels a chain 86 is led. In place of the chain any other flexible member, as is well known for a construction shown in Figure 9, which is trained over the wheels shown, may be employed. It will be appreciated, as shown in Figure 9, that the chain 86 is merely a flexible member or chain of the endless variety which supports the teeth and which is trained over the two wheels. This is similar to a tractor tread chain of caterpillar type. As appears from Fig. 9, this chain is provided with teeth 87 forming the extension of bows 88. When the teeth 87 are deflected laterally by their contact with the material or with the ground, their extension 88 abuts against a guide 89, by which the teeth cannot deviate too much beyond the vertical plane of the wheels 83 and 83A. The guide 89 may be formed for example by a wide plate extending from one wheel to the other. The chain 86 led around the wheels 83 and 83A is caused to move by the contact of the teeth 87 with the ground and delivers the material to the left. The material then comes before the chain running over the wheels 84 and 84A, which chain discharges it to the last chain. By this last chain the material is delivered to the left of the wheel 85A. The pressure of the teeth on the ground may be adjusted by more or less tightening springs 90 which are fixed with an extremity to the upper end of arms 91 mounted at right angles to the cranks 71—74. To this end the beam 60 is provided for each spring with a number of holes 92, into which the spring may be hooked.

It will be understood that provisions may be made to permit horizontal deviations of the bearings of the sprocket wheels.

A fourth embodiment of the device according to the invention has been diagrammatically shown in Figs. 10 and 11. Two coplanar sprocket wheels 93 and 94 are rotatable on parallel axes at the ends of two tubular rods 95 and 96. The upper ends of said rods intersect in a point where they are fixed to a short tube 97. A rod 98 connects the midportions of the tubes 95 and 96. When the short tube 97 is horizontal, the axes of the sprocket wheels make an angle of about 30° with the vertical. In the tube 97 a rod can be fixed permitting pulling or pushing forward the frame with the sprocket wheels, in such a manner that the connecting line of the centers of the sprocket wheels 93, 94 forms an angle with the direction of forward movement.

Over the sprocket wheels a chain 99 is led. This chain carries a plurality of teeth 100, of which the teeth situated in one of the straight chain parts are all simultaneously in touch with the ground. The teeth which contact the ground are substantially located in a vertical plane (see Fig. 11) and are supported by their extensions 101 which reach far above the chain and embrace with their eye-shaped free end an endless flexible steel wire 102. By the contact of the teeth 100 with the ground and by the oblique position of the row of teeth with regard to the travelling direction, the chain 99 will move round and upon forward movement of the device according to Fig. 10 the material will be delivered beside the sprocket wheel 94. Taking into consideration the large working width, this device is extraordinarily light in weight.

What we claim is:

1. A device for laterally displacing grass or hay or other material lying on the ground comprising a frame, at least one rake wheel having a hub, said rake wheel rotatably mounted on said frame in a substantially vertical plane, a substantially rigid part concentrically connected to said hub, raking means comprising an outer flexible rim member having raking teeth substantially concentric with said rigid part and spaced laterally therefrom, and hinge means interconnecting said rim member and said rigid part.

2. A device for laterally displacing grass or hay or other material lying on the ground comprising a frame, at least one rake wheel having a hub, said rake wheel rotatably mounted on said frame in a substantially vertical plane, a substantially rigid part concentrically connected to said hub, raking means comprising an outer flexible rim member having raking teeth substantially concentric with said rigid part, a plurality of link members pivotally connected to said rigid part and said flexible rim member.

3. A device for laterally displacing grass or hay or other material lying on the ground comprising a frame, at least one rake wheel having a hub, said rake wheel rotatably mounted on said frame in a substantially vertical plane, a rim concentrically connected to said hub, raking means comprising a second flexible rim member having raking teeth substantially concentric with said first rim member and spaced laterally therefrom, and hinge means interconnecting said rim members.

4. A device for laterally displacing grass or hay or other material lying on the ground comprising a frame, at least one rake wheel having a hub, said rake wheel rotatably mounted on said frame in a substantially vertical plane, a rim concentrically connected to said hub, raking means comprising a second flexible rim member having raking teeth substantially concentric with said first rim member and a plurality of link members pivotally connected to said first and second rims.

5. The device as defined in claim 1 wherein said hinge means comprises a plurality of rods composed of steel wire.

6. The device as defined in claim 3 wherein said hinge means comprises a plurality of rods composed of steel wire.

7. The device as defined in claim 1 wherein said hinge means comprises tangentially directed rods.

8. The device as defined in claim 3 wherein said hinge means comprises tangentially directed rods.

9. A device as defined in claim 1 wherein said raking teeth are of bent configuration and wherein said flexible rim member is of corrugated configuration in side elevation.

10. A device as defined in claim 2 wherein said raking teeth are of bent configuration and wherein said flexible rim member is of corrugated configuration in side elevation.

11. A device as defined in claim 3 wherein said raking teeth are of bent configuration and wherein said flexible rim member is of corrugated configuration in side elevation.

12. A device as defined in claim 4 wherein said raking teeth are of bent configuration and wherein said flexible rim member is of corrugated configuration in side elevation.

13. A device as defined in claim 1 wherein said flexible rim member is of strip steel.

14. A device as defined in claim 2 wherein said flexible rim member is of strip steel.

15. A device as defined in claim 3 wherein said flexible rim member is of strip steel.

16. A device as defined in claim 4 wherein said flexible rim member is of strip steel.

17. A device as defined in claim 1 wherein said raking teeth extend on the outer side of said flexible rim member and said hinge means extends inwardly from said flexible rim member to said rigid part.

18. A device as defined in claim 3 wherein said raking teeth extend on the outer side of said flexible rim member and said hinge means extends inwardly from said flexible rim member to said rigid part.

19. A device as defined in claim 1 wherein said hinge means comprises a plurality of U-shaped steel wire rods.

20. A device as defined in claim 3 wherein said hinge means comprises a plurality of U-shaped steel wire rods.

21. The device as defined in claim 1 wherein said hinge means comprises a plurality of horizontally extending rods.

22. The device as defined in claim 3 wherein said hinge means comprises a plurality of horizontally extending rods.

References Cited in the file of this patent

UNITED STATES PATENTS

| | | |
|---|---|---|
| 2,472,260 | Morrill | June 7, 1949 |
| 2,511,100 | Clark | June 13, 1950 |
| 2,545,723 | Conner | Mar. 20, 1951 |
| 2,657,519 | Hill | Nov. 3, 1953 |
| 2,735,256 | West | Feb. 21, 1956 |

FOREIGN PATENTS

| | | |
|---|---|---|
| 2,192 | Great Britain | 1904 |
| 318,860 | Germany | Feb. 14, 1920 |